May 5, 1964 M. AGAMENNONE ETAL 3,132,177
RECOVERY OF REACTION PRODUCTS AND OF CATALYSTS FROM THE
RAW PRODUCT OF THE SYNTHESIS OF ACETIC ACID
FROM CARBON MONOXIDE AND METHANOL
Filed May 23, 1961
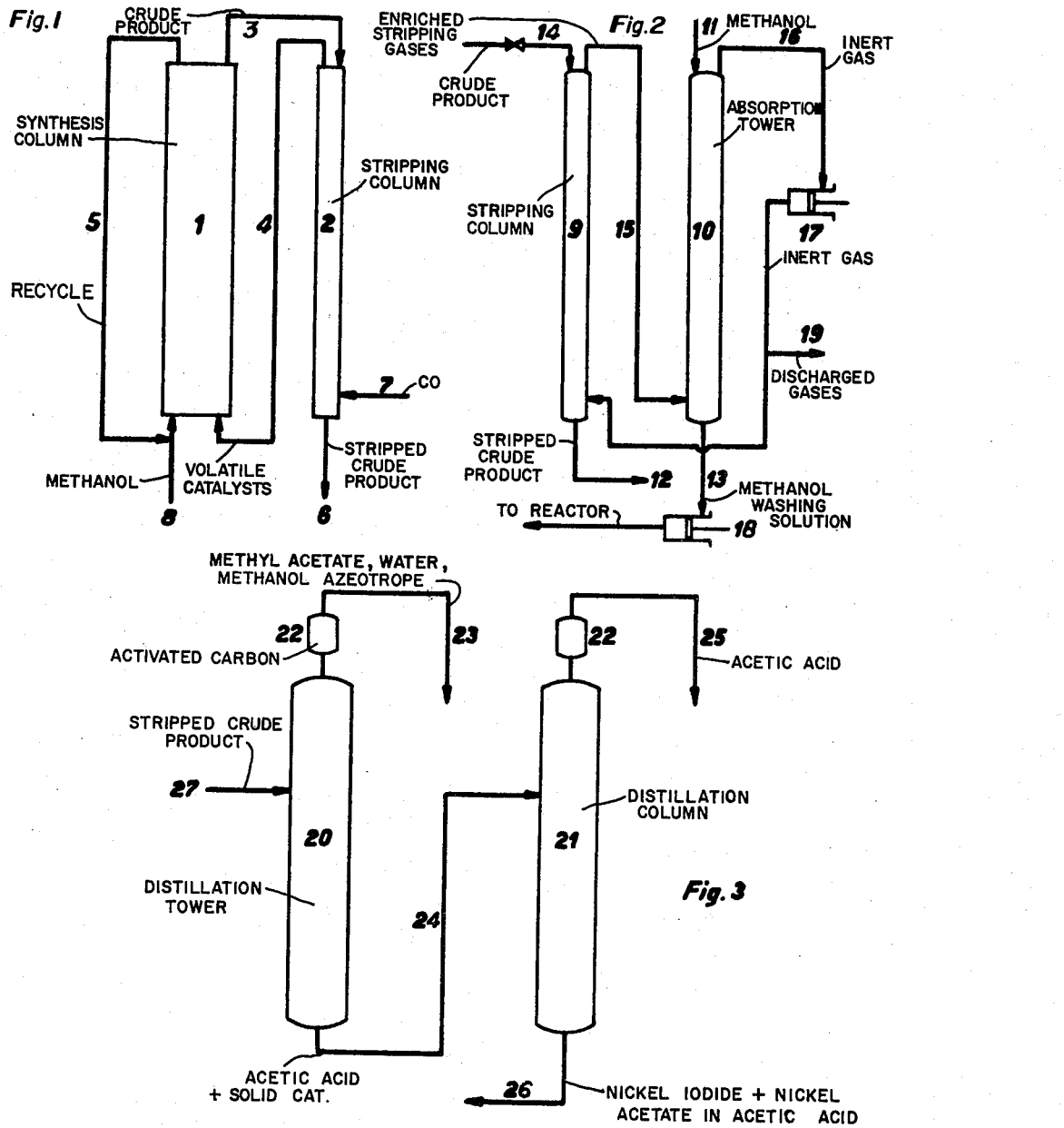
INVENTORS
Marco Agamennone &
Luigi Corsi

United States Patent Office 3,132,177
Patented May 5, 1964

3,132,177
RECOVERY OF REACTION PRODUCTS AND OF CATALYSTS FROM THE RAW PRODUCT OF THE SYNTHESIS OF ACETIC ACID FROM CARBON MONOXIDE AND METHANOL
Marco Agamennone, Novara, and Luigi Corsi, Milan, Italy, assignors to Montecatini-Societa Generale per l'Industria Mineraria e Chimica, a corporation of Italy
Filed May 23, 1961, Ser. No. 111,982
Claims priority, application Italy May 27, 1960
2 Claims. (Cl. 260—532)

Our invention relates to a process for recovering acetic acid and catalysts from a liquid crude product, obtained by the synthesis of acetic acid from methanol and carbon monoxide in the presence of nickel and iodine compounds as catalysts. The synthesis reaction may be carried out in gaseous phase at 150°–300° C. at pressures above 10 atm., or in liquid phase at temperatures in the range of 250°–300° C. at pressures above 200 atm. A suitable mixture of nickel compounds and of iodine compounds may be employed as a catalyst; among the nickel compounds, nickel per se, nickel carbonyl, and nickel salts (acetate) may be used, whereas among the iodine compounds, iodine per se, methyl iodide and nickel iodide may be used.

No matter what nickel and iodine compounds are used as a catalyst, under the temperature and pressure conditions of synthesis and the presence of carbon monoxide and acetic acid in the synthesis, a mixture of the following compounds is attained, which acts as a catalyst: methyl iodide, nickel carbonyl, nickel acetate, nickel iodide.

The following reactions occur:

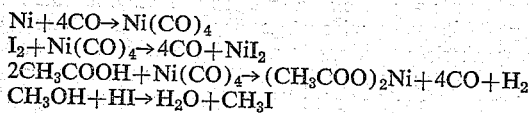

The amount of catalyst employed in the synthesis (per one kg. of methanol) may vary, according to the literature, from 2 to 80 g. of iodine and from 6 to 100 g. of nickel. For instance, when operating a continuous liquid phase process at 300 atm. and at 290° C., good output figures may be attained (4 kg. of acetic acid per liter of reactor capacity per day), employing 13 g. of iodine and 60 g. of nickel per kg. of methanol. In order that the process be economically profitable, it is necessary, due to the high cost of iodine and nickel and the relatively low price of acetic acid, that the recovery of the catalysts be as complete and as simple as possible.

In the specific case it should be borne in mind that the recovery of $Ni(CO)_4$, which is present in the crude reaction products at a concentration as high as 10–15%, encounters considerable difficulties if carried out by known methods, such as distillation, owing to the thermal instability of this compound. In fact, at 40–50° C. it tends to decompose into nickel and carbon monoxide, thereby causing clogging in the columns and reboilers as well as losses of product, which are carried along by part of the decomposition carbon monoxide.

Another method of nickel carbonyl removal from crude reaction products of this kind, consists of subjecting the crude reaction product to a rapid expansion in a vessel, at high temperature, in order to cause total decomposition of the $Ni(CO)_4$, so that the reaction liquid, after condensation and removal of the nickel powder by filtration or decantation, may be easily distilled, without the above mentioned drawbacks.

The above way of proceeding is rather onerous, due to the necessity of recycling the catalyst, in the solid phase, to the synthesis, and to the heavier apparatus equipment needed for recovering the products swept along by the carbon monoxide of decomposition. The necessity of preparing nickel carbonyl from the introduced metallic nickel in the reactor also creates difficulties.

Another difficulty, inherent in the treatment of the crude reaction products, originates from the ability of nickel iodide to decompose. This salt is present in the crude reaction products in small amounts; however, as the distillation proceeds for recovering acetic acid and methyl acetate (which is always present as a byproduct in the crude reaction products), it concentrates progressively in the distillation tails, with subsequent decomposition into nickel and iodine:

The former, reacting with acetic acid, yields nickel acetate:

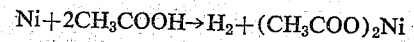

The iodine distils together with acetic acid and gives the acetic acid an intense red color. Further treatment, therefore, is required to decolor the acid, whereby the cycle becomes more complex with increasing iodine losses. A known method for recovering the nickel iodide originating from the crude products of methanol carbonylation utilizes autoclave treatment, at 150° C. and 75 atm., of nickel iodide solutions containing copper powder and carbon monoxide, so as to recover the nickel in the form of nickel carbonyl and the iodine as copper iodide, with 90% yields. Each of said recovery and purification methods meets some difficulties, because elements not connected with the synthesis are introduced thereby; or because operation involves solid substances, or the catalyst must be partially destroyed, causing the process to become less economical in some way.

An object of our invention is to provide a very simple method for the recovery of the catalysts in the reaction liquids in the form in which they are present, so as to permit ready re-use of the catalyst in the synthesis, while obviating the above mentioned disadvantages. Our precess gives high recovery yields and, therefore, an economical realization of the production cycle.

The mixture of compounds which catalyzes the synthesis and which is found again in the crude reaction product, is made up of nickel carbonyl, methyl iodide, nickel acetate, and nickel iodide. The former two are volatile (both boil at 42° C.) and hereinafter will be referred to by the generic term of volatile catalysts, while the latter two are salts which will be referred to by the generic term of solid catalysts.

For recovery and recycle of the volatile catalysts our invention provides stripping of the crude reaction products to be carried out in a packed or plate column by means of a gas containing at least 50% by volume of carbon monoxide, the balance being inert gases such as methane, carbon dioxide, nitrogen, hydrogen, etc., at a temperature above room temperature, at atmospheric or higher pressure.

When a gas with lower CO content is employed, a portion of the nickel carbonyl decomposes and metallic nickel is deposited. In the stripping operation, carried out at a temperature dependent on the pressure selected, the gas employed in suitable amount removes, from the crude reaction product, the volatile catalysts together with small amounts of water, methyl acetate and acetic acid, thereby yielding a stripped crude product free from methyl iodide and nickel carbonyl. When, for instance, the stripping operation is carried out under reaction pressure (280–360 atm.), it is very profitable to employ CO as the stripping gas, inasmuch as this may be directly fed to the synthesis while recycling the volatile catalysts contained in the raw product leaving the reactor. The amount of gas consumed in the synthesis (little more than one mole per mole of acid produced) is generally sufficient for carrying out the stripping, while operating for instance at 180° C. and 300 atm. However, when carrying out the stripping operation under atmospheric pressure, the degassing column is kept at a temperature which is 20–30° C. at the top of the column (higher temperatures are not advisable owing to the excessive dragging of acetic acid) and is about 70–110° C. at the bottom of the column. The temperatures are inversely proportioned to the amount of gas employed in the stripping operation and to the concentration of the methyl acetate present in the crude product. When operating at the above specified conditions, no decomposition of nickel carbonyl in the column is noticed and the crude stripped product is free from nickel carbonyl and methyl iodide.

If stripping at atmospheric or at slightly higher pressure, the volatile catalysts can be recovered from the CO employed in the stripping operation by direct recycling to the synthesis operation after having compressed the CO from the stripping. However, difficulties are encountered in the compression step due to corrosion by acetic acid and pollution by lubricating oil.

The above difficulties have been overcome, by recovering the volatile catalysts from the stripping gas, by absorption with methanol in a gas washing tower. The methanol solution of the catalysts is employed in the synthesis. The absorption temperature depends upon the pressure at which operation is carried out; when operating for instance at atmospheric pressure the washing may be performed at $-30°$ C., thereby obtaining, for instance, nickel carbonyl and methyl iodide concentrations of the order of 18% and 1–2%, respectively. The gases leaving the methanol washing tower are practically free from volatile catalysts and may be profitably reemployed in the stripping operations. When stripping and absorption are performed at a pressure of 5–8 atm., the recovery of the volatile catalysts from the gases is easier, and washing can be performed at a higher temperature. For instance, we have operated to advantage at $-10°$ C. and at a pressure of 8 atm.

It is possible to attain good stripping and high recovery yields of volatile catalysts within a wide range of temperatures and pressures in the stripping tower as well as in the washing tower, said values being a function of the concentration of the catalysts in the crude product (or of the synthesis operating conditions) and of the amount of gas employed in the stripping. The discharge gas of the synthesis circuit is added to the volatile catalysts containing gases originating from the stripping column, for recovering by means of methanol washing, the volatile catalysts (particularly nickel carbonyl) contained therein before removing the discharge gas from the cycle.

Recovery under pressure is simpler because the stripping gas is directly recycled, even though it requires expensive stripping equipment because of elevated temperatures and pressures. Moreover, a small column is required for the washing of the discharge gas with methanol.

With the recovery at atmospheric pressure, a stripping column, a washing column, and a cooling group are utilized in lieu of a pressurized column. The method has limitations in practice with respect to high catalyst concentrations in the crude product, owing to the limited solubility of nickel carbonyl $[Ni(CO)_4]$ in methanol and to the amount of methanol available being limited to the catalysis requirements.

The selection of the method of recovery, at atmospheric or higher pressure, depends on the operating conditions of the plant and chiefly on the catalyst concentration in the crude product. It is also possible to employ the two methods jointly.

FIG. 1 is a flow sheet of the crude product stripping and recovery of the volatile catalysts at synthesis pressure.

FIG. 2 is a flow sheet of the crude product stripping and recovery of the volatile catalysts at atmospheric pressure.

FIG. 3 is a flow sheet for the recovery of the solid catalysts.

Referring to the drawings in greater detail, in FIG. 1, the crude product leaves the synthesis column 1 through pipe 3 and is introduced at the top of the stripping column 2, the carbon monoxide needed for the synthesis being fed at the bottom 7 of the column. Gases enriched with volatile catalysts exit through pipe 4 and are introduced into the synthesis column 1. Methanol is fed at 8 and through pipe 5 a certain amount of gas and liquid is circulated to assist the reaction in 1. The stripped crude product, free from methyl iodide and nickel carbonyl, is discharged from 6.

In FIG. 2, the crude product leaves the reactor through pipe 14, and is decompressed at low temperature in the stripping tower 9 through which inert gas, free from nickel carbonyl and methyl iodide, circulates, propelled by pump 17, as it comes from the tower of methanol washing 10. The raw product, free from methyl iodide and nickel carbonyl, is discharged through pipe 12. The stripping gases, enriched with volatile catalysts, are streamed through pipe 15 to the absorption tower 10. Methanol is fed at the top of the tower 10 by pipe 11. The methanol washing solution goes out from tower 10 through pipe 13 and enters the reactor by means of pump 18. Discharge gases, free from nickel carbonyl and methyl iodide, coming from the synthesis circuit, are removed by pipe 19.

The crude product, stripped in the manner described above consists of acetic acid, methyl acetate, methylic alcohol, water, nickel iodide, nickel acetate. The ratios of the amounts of acetic acid to those of methyl acetate may vary within a very wide range, depending on variations of the synthesis conditions in accordance with which of the two above products is desired. The concentration of nickel acetate and of nickel iodide is also a function of the synthesis operating conditions; under particular conditions, however, each of the two salts may attain a concentration as high as 4–5%. The amount of water present is substantially related to the methyl acetate formation (one mole per mole) and to the amount possibly introduced into the synthesis tower along with the reactants. The amount of methyl alcohol depends on the degree of conversion in the reactor. It is generally present in small amounts, since high conversions are desired in the synthesis.

The stripped crude product, being free from nickel carbonyl, may now be readily distilled; the herein claimed process provides a distillation carried out on two columns in series. In the first column methyl acetate is distilled as heads between 55° and 60° C., as an azeotrope with water and possibly, if also methyl alcohol is present, as an azeotrope with water and methyl alcohol.

This operation may be carried out at atmospheric pressure when the concentration of nickel iodide in the reboiler does not reach that at which it would decompose into iodine and nickel as a result of the solution temperature.

On the other hand, when the operation is carried out at reduced pressure, a strong temperature drop of the solution occurs, whereby the nickel iodide decomposition is avoided.

To the second distillation tower the tail product coming from the first distillation is fed, which qualitatively is made up of acetic acid, water, nickel acetate, nickel iodide. As a head fraction, water and acetic acid are obtained, whereas in the tail or bottom portion a solution or suspension of nickel acetate and nickel iodide in acetic acid is discharged. The distilled acetic acid, according to the amount of water present, may be either directly employed or subsequently dehydrated, by known technique.

The tail fraction is directly recycled to synthesis for the reemployment of the nickel salts. The acetic acid contained therein acts as a vehicle for the two salts, and is generally a small amount compared to the total produced. While the use of reduced pressure in the first distillation tower is dependent on the quality of the product subjected to treatment, the second tower requires reduced pressure, since the highest concentration of nickel salts in the discharged acetic solution is necessary in order that the highest possible amount of distilled acetic acid may be recovered.

The purpose of reduced pressure is to prevent nickel iodide decomposition, thereby eliminating the necessity of iodine recovery from the distilled acetic acid which, depending on operating conditions, may attain concentrations as high as 1–2 g./liter of iodine and permit the direct recycle of the nickel iodide.

A colorless distilled product, with an iodine concentration of less than 0.001 g./liter can be obtained by simultaneous use of low residual distillation pressures and of low nickel iodide concentrations in the second distillation tower discharge product.

These operating conditions, however, burden the operation by the condensation of head product or by the excessive recycle of acetic acid to synthesis in the shape of an acetic solution of nickel salts. On the other hand, a less drastic degree of vacuum and higher concentrations of nickel iodide in said acetic solutions, allow less burdensome operating conditions and also high recovery yields of nickel iodide, the iodine content of distilled acetic acid being very low, i.e. in the order of 0.05 g./liter of acetic acid. It, however, has the disadvantage of slightly discoloring the distilled acid with iodine traces (optical density, with a 10 cm. cell and a wavelength of 470 A.) equal to 0.05, thereby being unsuitable for many uses.

We have found that this difficulty can be removed by treatment of the distilled acid with activated carbon, producing a quite colorless product. Such a discoloration is carried out either by placing cartridge of activated carbon in the vapors leaving the distillation tower, or by allowing the distilled acid to flow through a layer of decolorizing carbon.

With reference to FIG. 3, the crude product enters by pipe 27 into the distillation tower 20, at the top of which, by pipe 23, the methyl acetate is obtained as azeotrope, with water and methanol. The head fractions may be either directly recycled to synthesis, together with methanol containing the volatile catalysts, or employed for different purposes. The residue of column 20, containing the solid catalysts dissolved in aqueous acetic acid, passes through 24 to the distillation tower 21 and from pipe 25 the acetic acid output is withdrawn as head fraction, while from the bottom, through pipe 26, a solution or a suspension of nickel iodide and nickel acetate in acetic acid is discharged, which is recycled to synthesis together with methanol containing the volatile catalysts and occasionally with the methyl acetate withdrawn from 23.

Activated carbon may be placed into the tanks 22 through which the products leaving towers 20 and 21 pass. If, owing to excessive accumulation of iodine in activated carbon cartridges, the distilled product should assume a detectable coloration, said cartridges may be replaced by fresh ones.

Iodine is recovered from the exhausted cartridges by percolating them with methanol which is to be fed to the circuit through pipe 8 (FIG. 1) or pipe 11 (FIG. 2). In both cases recovery of iodine in this stage is quantitative.

The examples hereinbelow are given to more fully illustrate, but not to limit, the present invention.

*Example 1*

98% methyl alcohol is fed by pipe 8 to the above described equipment which is illustrated in FIG. 1 and is operated at a pressure of 300 atm. From the reactor, through pipe 3, a solution at 290° C. is continuously discharged, which has the following composition: methyl alcohol 3%, acetic acid 71%, methyl acetate 8%, water 4%, $Ni(CO)_4$ 10%, methyl iodide 2%, nickel salts 2%. This solution is conveyed to the top of tower 2 maintained at a temperature of 180° C. The carbon monoxide needed for the synthesis is introduced from 7, while from pipe 6 a crude product is discharged having the following composition: acetic acid 86%, methyl acetate 7%, methyl alcohol 2%, water 3%, nickel carbonyl traces, methyl iodide traces, nickel iodide 1%, nickel acetate 1%.

*Example 2*

The equipment described above, as illustrated in FIG. 2, is operated by continuous process under the following conditions: working pressure, atmospheric; washing tower temperature, —30° C.; stripping tower temperature, top 25° C.; bottom, 110° C. Stripping tower 9 is supplied with a crude synthesis product whose liquid phase has the following composition: methanol 4%, acetic acid 60%, methyl acetate 17%, water 6%, methyl iodide 1%, nickel carbonyl 8%, nickel salts 4%. The stripped product is free from nickel carbonyl and from methyl iodide (each less than 0.01%).

The absorption tower (10) is supplied at top with a 98% methanol feed and the discharge product has the following composition: methanol 73%, water 3%, methyl acetate 5%, nickel carbonyl 17%, methyl iodide 2%. The stripping gas circulates in the circuit at a rate of about 0.8 mole per mole of the total of methyl acetate and acetic acid. The gas vented from the synthesis circuit is removed, after purification by passing through the methanol tower, by pipe 19, and has the following composition: carbon monoxide 60%, carbon dioxide 16%, methane 16%, nickel carbonyl traces, methyl iodide traces, nitrogen 8%.

*Example 3*

In the same equipment as employed in Example 2, a test was carried out with a crude product of different composition and under the following conditions: working pressure, atmospheric; washing tower temperature, —30° C.; stripping tower temperature, top 25° C.; bottom, 85° C. A synthesis product having the following composition: methanol 8%, methyl acetate 34%, acetic acid 40%, water 9%, methyl iodide 1%, nickel carbonyl 6%, nickel salts 2%, was fed to the stripping tower 9

The stripping gas was circulated in the stripping tower at the rate of 1 mole per total moles of methyl acetate and acetic acid. The stripped product contained traces of methyl iodide and of nickel carbonyl. A 98% methanol was fed at the top of the absorption tower 10. The discharge product has the following composition: methanol 76%, water 4%, methyl acetate 6%, nickel carbonyl 12%, methyl iodide 2%. The gas vented from synthesis, after purification through absorption tower 10, was removed through pipe 19 and does not contain any detectable amounts of methyl iodide and and nickel carbonyl.

*Example 4*

A stripped crude product having the following composition: methyl alcohol traces, acetic acid 77%, methyl acetate 15%, water 5%, nickel iodide 1%, nickel acetate 1%, various impurities 1%, is fed at 27 to the equipment for continuous operation as illustrated in FIG. 3, wherein no activated carbon cartridges have been placed. While the first column is operated at atmospheric pressure, the second one is operated at a residual pressure of 100 mm. Hg. All of the methyl acetate in azeotrope with water was recovered from pipe 23; acetic acid having a concentration higher than 90%, the balance being water, was withdrawn from pipe 25 while a suspension which contains about 12% nickel iodide and 12% nickel acetate was discharged from the bottom of tower 21. The distilled acetic acid contain 0.02 of iodine/liter of acid.

Example 5

In the same equipment as employed in Example 4, a crude product having the following composition: methyl alcohol traces, acetic acid 86%, methyl acetate 10%, water 3%, nickel iodine 0.5%, nickel acetate 0.4%, impurities 0.1% is distilled. The equipment is operated at the same pressure conditions as indicated in Example 4, with a cartridge of activated carbon inserted in the vapors leaving tower 21. Methyl acetate containing about 20% of water and small amounts of acetic acid is obtained from the top of the first tower, while 99% acetic acid, perfectly colorless and free from iodine, is withdrawn from the top of tower 21. A solution which contains nickel acetate and nickel iodide together amounting to about 10% is discharged from the bottom of the second tower.

The herein described recovering method can be applied to all of the crude products of acetic acid synthesis having the specified qualitative composition, even if methyl acetate and water are employed as the starting materials in lieu of methanol.

We claim:

1. A process for the recovery of catalysts from the crude reaction product obtained in the synthesis of acetic acid from methanol and carbon monoxide in the presence of a mixed nickel-iodine catalyst, consisting of nickel carbonyl, nickel acetate, nickel iodide and methyl iodide, which comprises stripping the crude reaction product by bringing a gas containing at least 50% by volume of carbon monoxide, the remainder being inert components, in contact with the crude reaction mixture, to remove and recover volatile nickel carbonyl and methyl iodide catalysts, without decomposition of said volatile catalysts; distilling said stripped crude reaction product to separate pure acetic acid and to recover a tail portion containing non-volatile nickel acetate and nickel iodide catalysts; and recycling said non-volatile catalysts.

2. A process for the recovery of catalysts from the crude reaction product obtained in the synthesis of acetic acid from methanol and carbon monoxide in the presence of a mixed nickel-iodine catalyst, consisting of nickel carbonyl, nickel acetate, nickel iodide and methyl iodide, which comprises stripping the crude reaction product with a gas containing at least 50% by volume of carbon monoxide, the remainder being inert components, in contact with the crude reaction mixture, to remove volatile nickel carbonyl and methyl iodide catalysts, without decomposition of said volatile catalysts; washing the volatile catalyst containing stripping gas with methanol; conveying said methanol to the acetic acid synthesis reactor; distilling said stripped crude reaction product to separate pure acetic acid and to recover a bottom portion containing non-volatile nickel acetate and nickel iodide catalysts; and recycling said non-volatile catalysts to said synthesis reactor.

References Cited in the file of this patent
UNITED STATES PATENTS

| | | |
|---|---|---|
| 2,650,245 | Thomas et al. | Aug. 25, 1953 |
| 3,060,233 | Hohenschutz | Oct. 23, 1962 |

FOREIGN PATENTS

| | | |
|---|---|---|
| 544,255 | Great Britain | Apr. 3, 1942 |